United States Patent [19]
Weisse

[11] Patent Number: 4,967,533
[45] Date of Patent: Nov. 6, 1990

[54] TETRAHEXAGONAL TRUSS STRUCTURE

[75] Inventor: Dick O. Weisse, Camarillo, Calif.

[73] Assignee: Tetrahex, Inc., Camarillo, Calif.

[21] Appl. No.: 402,451

[22] Filed: Sep. 1, 1989

Related U.S. Application Data

[63] Continuation-in-part of Ser. No. 266,386, Nov. 2, 1988.

[51] Int. Cl.$^5$ .................................................. E04C 2/32
[52] U.S. Cl. ......................................... 52/603; 52/648; 52/DIG. 10; 428/180
[58] Field of Search ................. 52/DIG. 10, 727, 734, 52/630, 648; 156/197, 196; 428/180

[56] References Cited

U.S. PATENT DOCUMENTS

| | | | |
|---|---|---|---|
| 3,642,566 | 5/1970 | Figge | 52/DIG. 10 X |
| 3,665,882 | 5/1972 | Georgiev et al. | 52/DIG. 10 X |
| 3,842,768 | 3/1972 | Maistre | 52/DIG. 10 X |
| 3,974,600 | 8/1976 | Pearce | 52/DIG. 10 X |
| 4,241,117 | 12/1980 | Figge | 52/DIG. 10 X |

OTHER PUBLICATIONS

*Space Grid Structures*, John Borrego, pp. 60, 70, 71, ©1968.

*Primary Examiner*—David A. Scherbel
*Assistant Examiner*—Linda J. Hoffert
*Attorney, Agent, or Firm*—Koppel & Jacobs

[57] ABSTRACT

A lightweight, high strength moldable structure is comprised of a core having a plurality of interconnected cavities. Each solid-walled cavity has a hexagonal base so that the core of the structure has upper and lower surfaces. Each solid-walled cavity has a unique tetrahexagonal shape in which a regular tetrahedron is located on top of and integrated with a hexagonal base. The walls of the cavities may be solid or they may be defined by a series of support struts for an even lighter weight structure. The upper and lower surfaces may be covered by skins, making it suitable for boat hulls, vacuum chambers, and aircraft. The hexagonal bases of the solid walled cavities may be replaced by perpendicular support walls extending between the adjacent tetrahedral apices and/or hexagonal base vertices.

18 Claims, 19 Drawing Sheets

FIG. 11
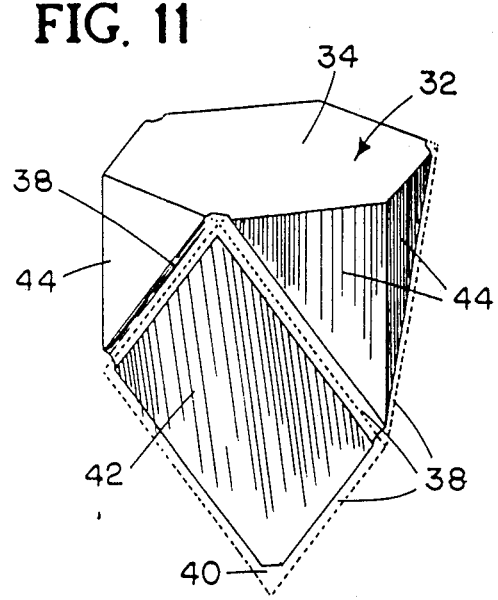
FIG. 13
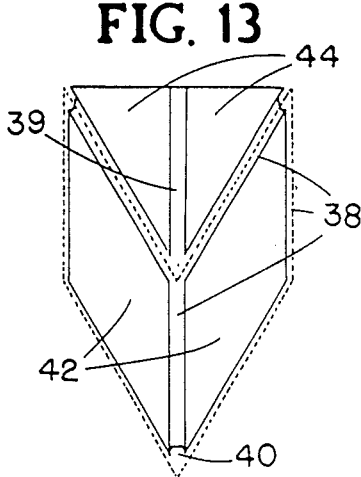
FIG. 12
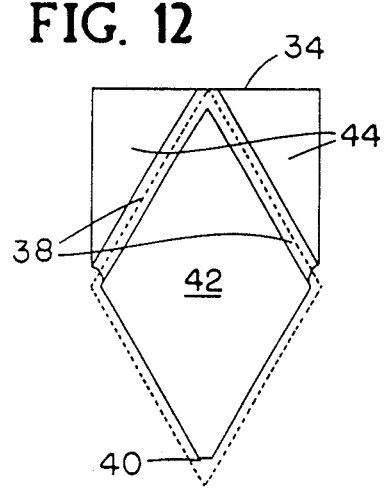
FIG. 14
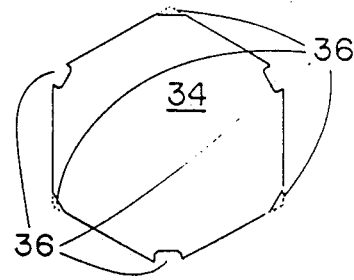
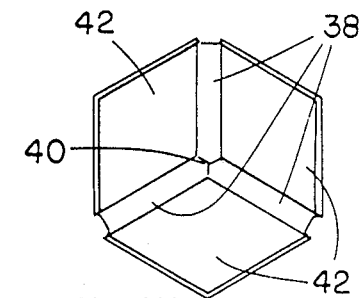
FIG. 15

FIG. 23
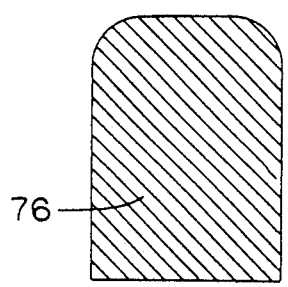
FIG 24
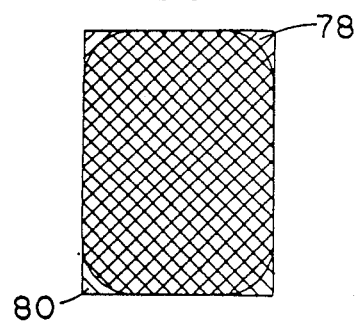
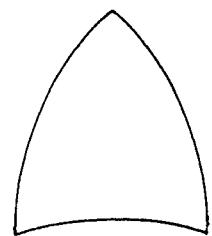 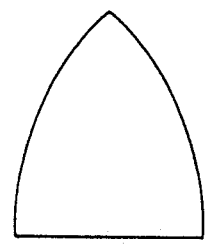 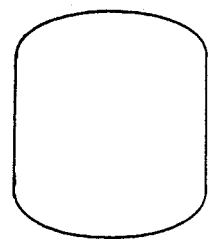 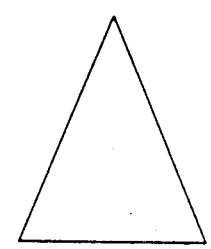
FIG. 25A    FIG. 25B    FIG. 25C    FIG. 25D
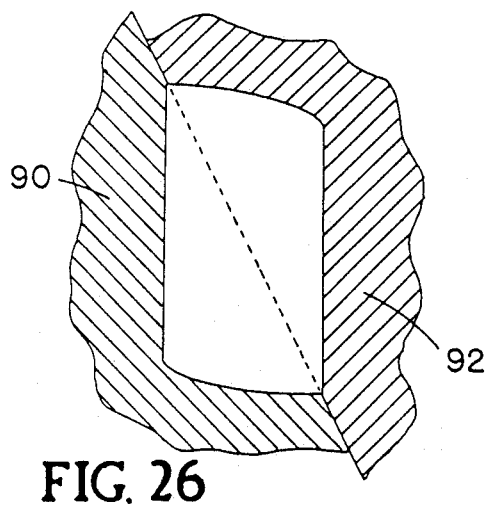
FIG. 26
FIG. 27
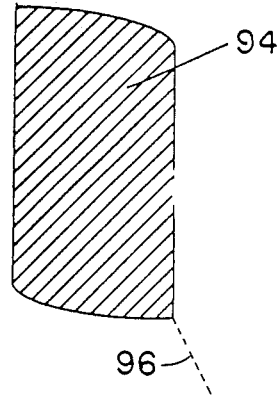

TETRAHEXAGONAL TRUSS STRUCTURE

CROSS REFERENCE TO RELATED APPLICATION

This application is a continuation-in-part of copending U.S. patent application Ser. No. 266,386, filed Nov. 2, 1988, by the present inventor Dick Weisse.

BACKGROUND OF THE INVENTION

1. Field of the Invention

This invention relates to truss structures of the honeycomb type.

2. Description of the Prior Art

A number of honeycomb structures are known that may be used as support walls, building enclosures and roofs. For example, U.S. Pat. No. 3,642,566 issued Feb. 15, 1972 to Figge and U.S. Pat. No. 3,645,833 issued Feb. 29, 1972 to Figge illustrate a truss structure having tetrahedron-shaped elements. U.S. Pat. Nos. 3,849,237 issued Nov. 19, 1974 to Zetlin and 3,906,571 issued Sept. 23, 1975 to Zetlin disclose structures having tetrahedron-shaped modular sections made of sheet metal that are bonded together. Also, U.S. Pat. No. 3,914,486 issued Oct. 21, 1975 to Borgford discloses a structure made of three-sided half cubes that are interconnected by their bases.

Another U.S. Pat. No. 2,481,046 issued Sept. 6, 1949 to Scurlock discloses a structure similar to that of Borgford, in which the three-sided half cubes are embodied by tetrahedrons or four-sided pyramids.

The primary disadvantage of many prior art structures is that they are difficult to mold and thus are expensive to manufacture. Another disadvantage is that they often may be made only in sheets, and cannot be easily formed or bent into other shapes.

A disadvantage of the more light weight prior art truss structures is that they are not real strong and cannot be twisted or compressed without damage to the structure. Stresses placed at one point of such structures are not adequately distributed throughout the structure, resulting in structural failures.

SUMMARY OF THE INVENTION

The present invention overcomes the problems with the prior art by providing a strong lightweight truss structure that can easily be molded, and may be formed into flat, circular or other curved shapes.

Another feature and advantage of the truss structure according the present invention is that stresses placed at any point in the structure are distributed throughout the structure for added strength.

Another feature and advantage of the present invention is that the dies used to make the structure having solid walls may be easily and inexpensively manufactured from hexagonal bar stock.

These and other features and advantages of the present invention are realized in a lightweight, novel and unique high-strength truss structure having a core comprised of a plurality of interconnected cavities with solid walls, each cavity having a hexagonal base. The upper and lower outer surfaces of the core have a plurality of hexagonal-shaped bases connected in a honeycomb array arrangement. Each cavity in the core has a unique tetrahexagonal shape in which a hexagonal base and its side walls are integrated with the base and side walls of a three-sided tetrahedron or pyramid shape. The tetrahexagonal cavity has three parallelogram-shaped side walls. One vertex of each parallelogram-shaped side wall intersects with a corresponding vertex of the other two parallelograms to create the apex of the tetrahedron; the opposing vertex of each parallelogram intersects one of the six vertices of the hexagonal base. The other six sides of the tetrahexagonal-shaped cavity are optional right triangles that are arranged into pairs having a common first triangle edge. A second triangle edge of each triangle is also an edge of the hexagonal base. The third triangle edge of each triangle is also an edge of a parallelogram side wall.

The walls of the cavities may be solid, or they may be defined by a series of parallelogram struts for an even lighter weight structure. Horizontal support struts may be added for increased strength.

The core may be shaped into circular, flat or curved forms. The upper and lower honeycomb array surfaces of the core may optionally be covered by skins to form a solid panel. The structure with the skins is suitable for any application where lightweight, strength, and compressibility are desired, including aircraft, boat hulls, rocket walls, and vacuum chambers.

A major advantage of the truss structure is that it may be molded. To make the structure that has solid cavity walls, two opposing plates are brought close together, each plate having an array of adjacent dies extending from its face. Each die has a tetrahexagonal shape corresponding to the tetrahexagonal-shaped cavities discussed above. The hexagonal bases of the dies are affixed to the plates. The apices of the tetrahexagonal dies on each plate are moved close to and aligned with the complementary cavities between the dies in the opposing plate. A core material such as molten plastic flows between the opposing dies of the two plates to form a truss structure having solid walls. Skins may then be attached to the upper and lower honeycomb surfaces of the core.

To make the truss structure having parallelogram struts that define hollow parallelogram side walls instead of solid cavity walls, the opposing dies are positioned so that their opposing walls actually touch each other. However, the edges of the dies are milled down so that molten plastic flows between adjacent opposing dies into the voids left by the milled-away portions of the edges. This results in a parallelogram strut being formed at each place where three flat surfaces would otherwise intersect in the solid cavity wall embodiment. Additional horizontal support struts may be made by forming horizontal grooves in the three parallelogram-shaped side walls—except on the outside walls of the dies on the perimeter of the mold array—so that each horizontal groove joins the two opposing parallelogram vertices in each parallelogram wall that are closest together. Plastic flows into the grooves to form the horizontal struts. The strut structure having horizontal struts is particularly strong because the horizontal and parallelogram struts meet to form twelve-point hubs from which struts radiate in twelve directions. The twelve-point hub structure provides maximum stability and assures that a load applied to any part of the structure is distributed throughout the entire truss structure.

The solid cavity wall embodiment of the present invention may also be drawn or stamped from metal because the entire surface area of each cavity is the same as its outer surface area; there is no additional surface area in the interior of any cavity.

The structure may modified by truncating the apices of the tetrahedrons and/or making them hollow.

The solid core structures disclosed in the above discussed patents to Borgford and Scurlock, without the addition of external skins, are quite flexible. Both of these patents teach how to make the structure resistant to bending by adding inner and outer skins, which interconnect the vertices of the tetrahedrons or pyramids. In accordance with another embodiment of the present invention, the basic structure disclosed in the Borgford and Scurlock patents is improved upon by replacing the external skins with perpendicular support walls which greatly increase the stiffness and bending resistance of the structure while attaining a major reduction in weight and volume. More specifically, this goal is attained by replacing the perpendicularly extending hexagonal bases in the solid core embodiment of the invention with perpendicularly extending support walls which at least partially interconnect adjacent tetrahedral apices and/or base vertices. This configuration enables the structure to be both rigid and thin without the addition of external skins. p These and other features and advantages of the invention will be apparent to those skilled in the art from the following detailed description of preferred embodiments, taken together with the accompanying drawings, in which:

BRIEF DESCRIPTION OF THE DRAWINGS

FIG. 11 is a diagrammatic view of a die according to a second embodiment of the present invention, the die having milled parallelogram edges for making the parallelogram struts.

FIG. 12 is a side view of the die depicted in FIG. 11 showing a parallelogram wall and two triangular walls.

FIG. 13 is a second side view of the die depicted in FIG. 11 showing two parallelogram walls and two triangular walls and also having optional milled triangle edges 39.

FIG. 14 is a bottom view of the die depicted in FIG. 13 showing the hexagonal base with milled vertices.

FIG. 15 is a top view of the die depicted in FIG. 11 with the apex at the center of the drawing.

FIG. 23 is a cross-sectional view of a preferred shape for a parallelogram strut.

FIG. 24 is a top view of the meeting of two parallelogram struts, one parallelogram strut having the shape depicted in FIG. 23 and being made by the lower die array, and the other parallelogram strut being made using the upper die array having the same shape but rotated 180°.

FIGS. 25A through 25D are cross-sectional views of alternate shapes for the parallelogram struts.

FIG. 26 is a drawing depicting the meeting of two grooved sides to form a horizontal strut.

FIG. 27 is a cross-sectional view of the preferred shape for a horizontal strut.

DESCRIPTION OF THE PREFERRED EMBODIMENTS

Figure 1:
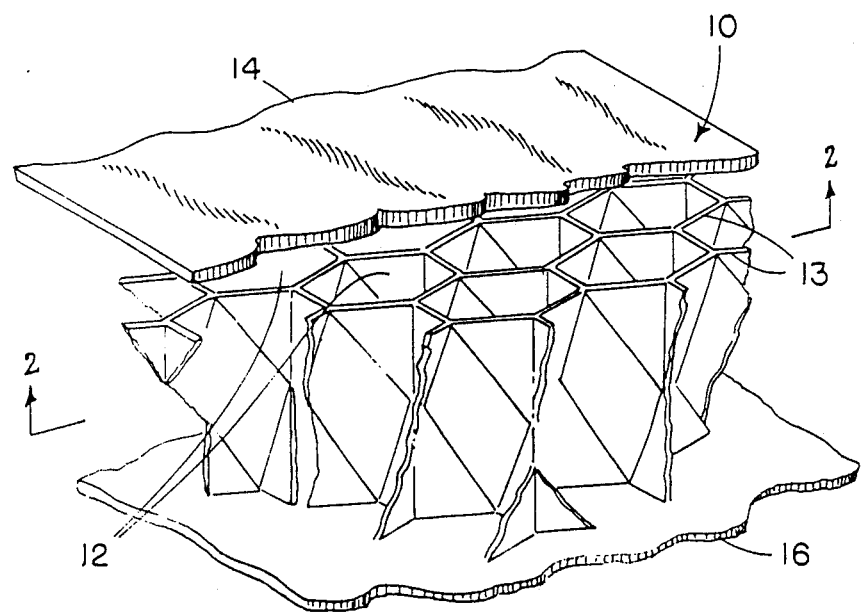
FIG. 1 is a fragmentary perspective view of a first embodiment of the truss structure according to the present invention having solid planar side walls.

FIG. 1 is a fragmentary perspective view of a first embodiment of a truss structure according to the present invention. In FIG. 1 truss structure 10 is comprised of an array of adjacent cavities 12 arranged in a honeycomb fashion. Each cavity is defined by a plurality of solid planar side walls 13 as further discussed below. The honeycomb cavities are covered by an upper skin 14 and a lower skin 16 to form a solid planar structure 10. Skins 14 and 16 are glued to the upper and lower honeycomb surfaces of the structure to form solid planar surfaces. The core comprised of adjacent cavities 12 may be used in any application where compressibility and lightweight strength are required, including boat hulls, aircraft, and vacuum chambers. The core depicted in FIG. 1 can be bent only to a limited extent.

Figure 2:
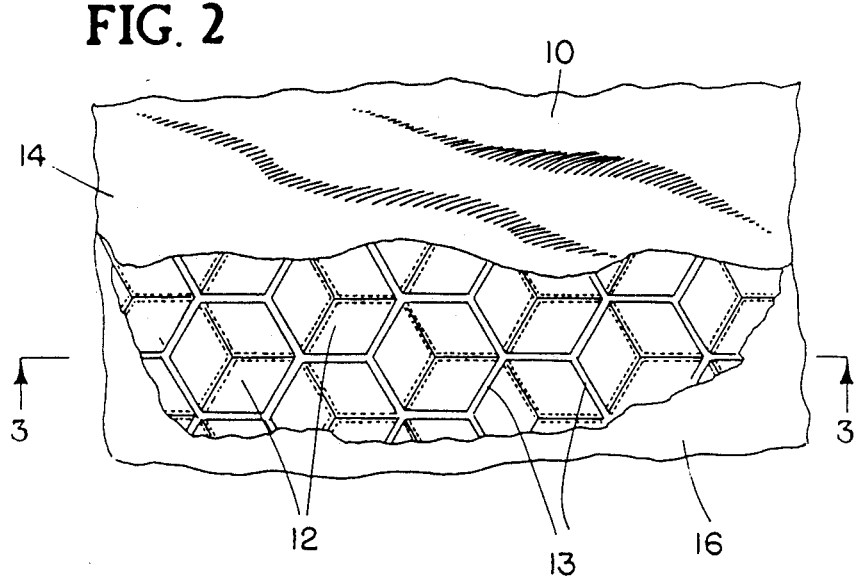
FIG. 2 is a fragmentary top view of the first embodiment of the truss structure.
Figure 3:
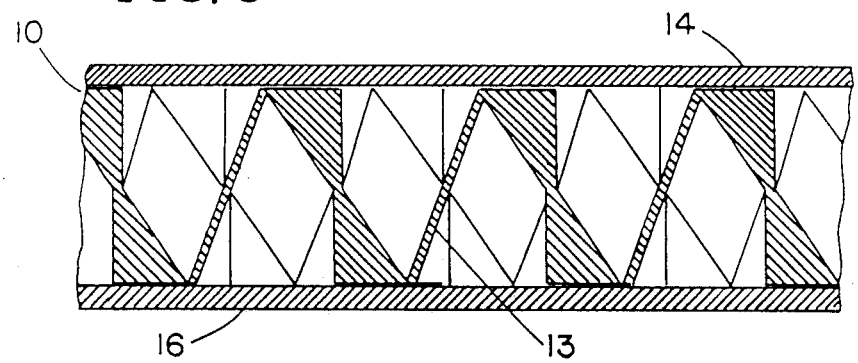
FIG. 3 is a side sectional view of the truss structure taken along the line 3—3 of FIG. 2.

FIGS. 2 and 3 also depict the first embodiment of structure 10 shown in FIG. 1. FIG. 2 is a fragmentary top view of the structure showing the honeycomb upper surface of the structure's core where the hexagonal bases of cavities 12 are interconnected to form the upper surface of the core. FIG. 3 is a side-sectional view of structure 10, taken along line 3—3 of FIG. 2. Side walls 13 define cavities 12, which in turn are covered by an upper skin 14 and a lower skin 16.

The core is comprised of a plurality of adjacent tetrahexagonal cavities arranged in a honeycomb array to form upper and lower array surfaces. Each cavity is essentially a tetrahedron, having tetrahedron edges, that is located on top of and integrated with a hexagonal base having six base vertices and six base edges. The apex of the tetrahedron coincides with the apex of the cavity. The cavity has three parallelogram-shaped side walls and six optional triangular side walls. Each parallelogram wall has four parallelogram vertices and four parallelogram edges. Each triangle has three triangle vertices and three triangle edges.

If the optional triangular walls are not used, the core may be easily bent. Also, such a core may be stamped or drawn from a metal like aluminum. The base of such a cavity will have three base vertices and three base edges.

For each parallelogram-shaped wall of the cavity, one parallelogram vertex intersects the apex of the cavity. Thus, three parallelogram vertices create the cavity apex. The opposing parallelogram vertex in each parallelogram wall intersects a vertex of the hexagonal base.

The optional six triangle walls are arranged in pairs between adjacent parallelogram walls. Each pair of triangle walls has a first common triangle edge. For each triangle, a second triangle edge is also a base edge, and the third triangle edge of each triangle is also a parallelogram edge.

The shape of the cavities is substantially the same as the shape of the walls of the tetrahexagonal dies discussed below in connection with FIG. 6 for the core structure having triangular walls.

Skins may be applied to the upper and lower honeycomb surfaces of the core after the core has been created.

Figure 4:
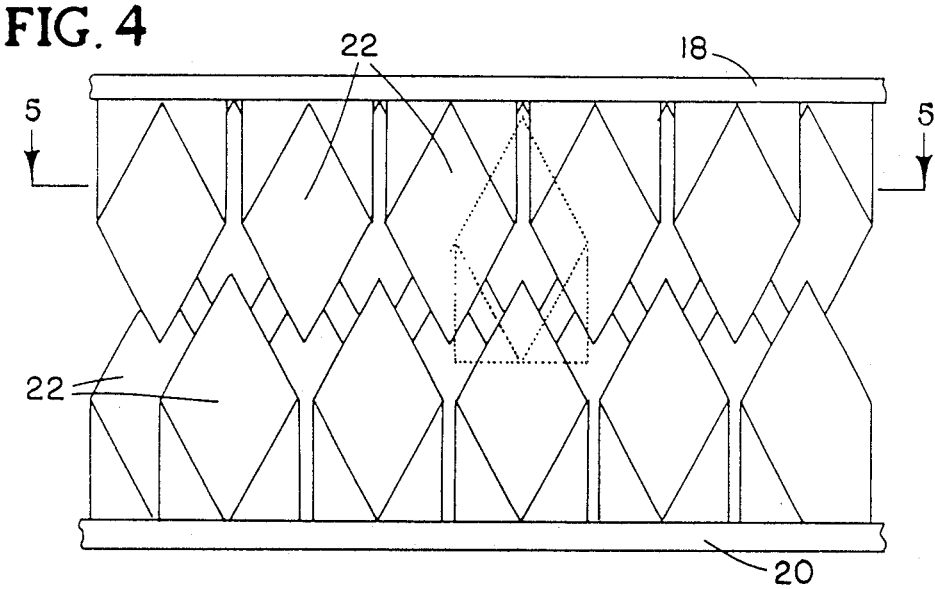
FIG. 4 is a side view of the upper and lower die arrays used to make the first embodiment of the truss structure.
Figure 5:
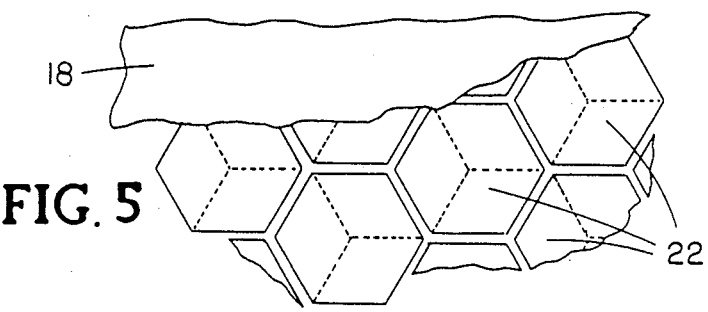
FIG. 5 is a top view of the upper die array in FIG. 4, taken along line 5—5.

Referring to FIG. 4, structure 10 is preferably formed by a molding, drawing or stamping process in which an upper array of adjacent tetrahexagonal dies 22 attach to an upper plate 18 are aligned with and moved close to a similar lower array of dies 22 attached to a lower plate 20. If a molding process is used, molten plastic flows in the space between the upper and lower dies 22 to form the core of the structure. If the structure is drawn or stamped from metal, a metal sheet is placed over lower dies 22 and is shaped by the downward force of dies 22 attached to upper plate 18. The top view of the dies 22 attached to upper plate 18 is shown in FIG. 5.

To make the solid planar wall core without triangular walls, adjacent dies 22 on the same plate are arranged to touch each other so that no plastic flows between them. Plastic only flows between dies on different plates.

The structure is manufactured using a series of substantially identical dies 22 having a unique shape. Each die has a tetrahexagonal shape in which a tetrahedron (pyramid) is integrated with a hexagonal base and its side walls. FIGS. 6 through 10 are various views of this die. In FIG. 6, die 22 is comprised of a tetrahedron having an apex at a point 30 and parallelogram-shaped walls 26. Hexagonal base 24 and its six triangular side walls 28 are integrated with the tetrahedron and its four parallelogram-shaped walls 26 to form the tetrahexagonal shape. The apex of the tetrahedron coincides with the apex of the die. The apex is located on the opposite end of the die from the base.

Figure 6:
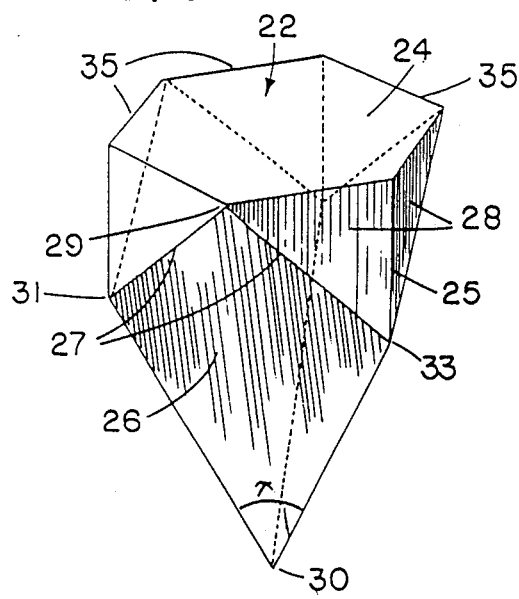
FIG. 6 is a diagrammatic view of a single die used to make the first embodiment of the truss structure.

As depicted in FIG. 6, die 22 has three parallelogram walls 26, each of which has four parallelogram edges 27 and four parallelogram vertices 29, 30, 31 and 33. Vertex 30 of each parallelogram wall intersects the apex at the point 30. The opposing parallelogram vertex 29 intersects a vertex of hexagonal base 24.

Die 22 also has six triangular walls 28 which are arranged into pairs. Each triangular wall 28 has three triangle edges 25, 27 and 35. Each pair of walls 28 has a common first triangle edge 25. Each triangular wall 28 has a second triangle edge 35 that is also a base edge, and a third triangle edge 27 that is also a parallelogram edge.

The apex angle s is preferable 60° so that the top portion of the tetrahexagonal die is a regular tetrahedron. However, the apex angle s may be varied from 0° to 120°. All of the other angles of the die are determined by the choice of the apex angle. The volume of the die and thus of the truss structure is determined by the distance between the apex and the base of the die and its apex angle.

Figure 8:
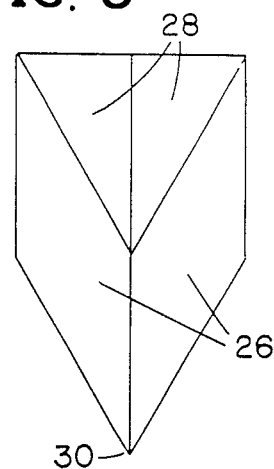
FIG. 8 is a second side view of the die in FIG. 6 depicting two parallelogram walls and two triangular walls.
Figure 7:
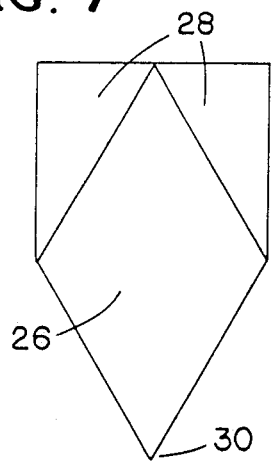
FIG. 7 is a side view of the die in FIG. 6 depicting a parallelogram face and two triangular walls.
Figure 9:
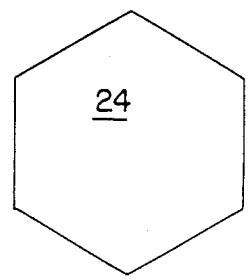
FIG. 9 is a bottom view of the die depicted in FIG. 6 showing the hexagonal base.
Figure 10:
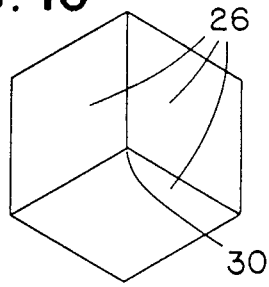
FIG. 10 is a top view of the die depicted in FIG. 6 showing the apex at the center of the drawing.

FIGS. 7 and 8 are two different side views of the die depicted in FIG. 6. The side view depicted in FIG. 7 shows a single parallelogram wall 26 and two right triangular walls 28. The second side view depicted in FIG. 8, taken from a different angle, shows two parallelogram-shaped walls 26 and two right triangular walls 28. FIG. 9 is a bottom view of die 22 showing the hexagonal base. FIG. 10 is a top view of die 22 depicting the meeting of the three parallelogram walls 26 at a single point, namely apex 30.

Die 22 may be made from a piece of hexagonal bar stock in which three cuts are made to create the parallelogram side walls 26. The cuts are made so that these parallelogram walls meet at apex 30.

Instead of having solid planar side walls, the truss structure according to the present invention may be comprised of parallelogram struts forming hollow parallelogram-shaped walls to make an even more lightweight structure. The parallelogram struts are formed by milling down the parallelograms' edges of the tetrahexagonal die 22 depicted FIGS. 6 through 10, so that spaces are formed between adjacent edges when three dies meet during the molding process. Molten plastic flows through the gaps formed by the meeting of three milled down parallelogram edges to form the parallelogram struts. Although the second embodiment having parallelogram struts is much lighter than the first embodiment described above having solid planar walls, the strut embodiment is more difficult to mold. The solid planar wall core is much stronger than the core comprised of struts.

Figure 28A:
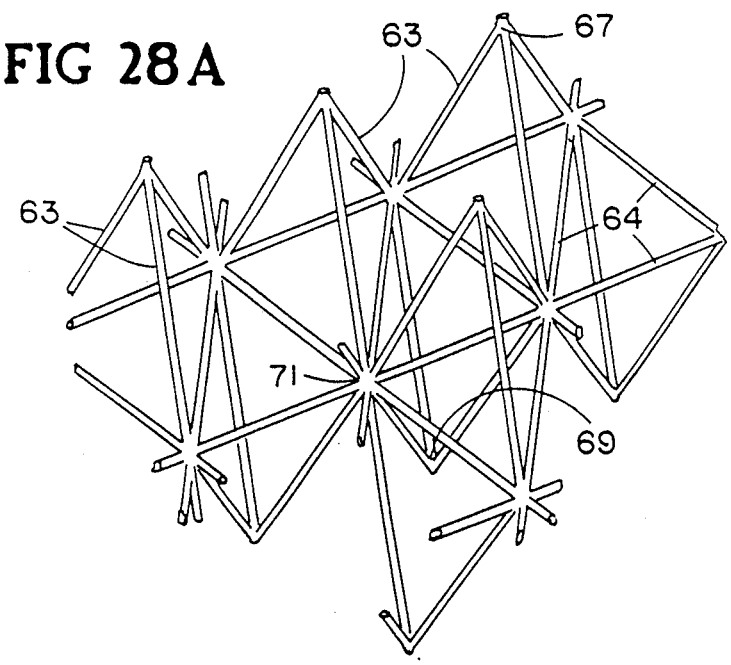
FIG. 28A depicts the core structure having hollow parallelogram walls defined by parallelogram struts.

FIG. 28A depicts a core according to the present invention having adjacent cavities arranged to form upper and lower array surfaces. Each cavity has three hollow side walls defined by parallelogram struts 63 and optional horizontal struts 64. Each cavity has an apex 67 on the opposite end of the cavity from the base. The cavity is a tetrahedron integrated with a base having at least three base vertices 69 such that three hollow walls defined by parallelogram struts 63 are parallelograms. Each parallelogram wall has four parallelogram vertices, with a first parallelogram vertex of each parallelogram wall intersecting apex 67. A second opposing parallelogram vertex of each parallelogram intersects a base vertex 69. Optional horizontal struts 64 may be used which, with parallelogram struts 63, create 12-point hubs 71 for added strength. Horizontal struts 64 join the third and fourth opposing parallelogram vertices of each parallelogram.

Figure 28B:
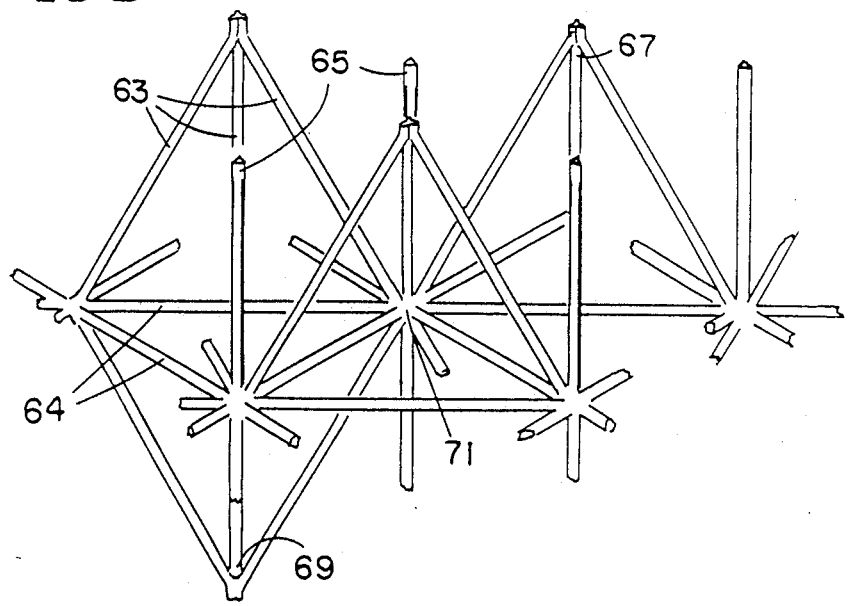
FIG. 28B depicts the core structure of FIG. 28A having additional triangle struts.

FIG. 28B depicts the core of FIG. 28A except that triangle struts 65 have been added. Triangle struts 65 are optional, but if they are used a hexagonal base having six base vertices is created. Adjacent base vertices may be connected by base struts (not shown). Triangle struts 65 are created if the first triangle edges discussed above are milled down.

If triangle struts 65 are used, six additional hollow triangle walls are created in the cavity, each triangular wall being defined by two triangle struts and a base vertex. These six triangle walls are arranged in pairs such that each pair has a common first triangle strut 65, and the second triangle strut of each triangular wall is also a parallelogram strut.

FIGS. 11 through 15 depict different views of the tetrahexagonal die used to form the second embodiment of the truss structure having parallelogram struts. The diagrammatic view of die 32 in FIG. 11 depicts milled edges 38 formed between parallelogram walls 42 and the right triangular walls 44. FIGS. 12 and 13 depict two different side views of the die shown in FIG. 11. The side view shown in FIG. 12 depicts a parallelogram wall 42 whose milled parallelogram edges 38 meet right triangular side walls 44. The die apex 40 is also milled down. The second side view depicted in FIG. 13 shows two parallelogram walls 42 and two right triangular walls 44. The walls meet in milled parallelogram edges 38.

FIGS. 14 and 15 depict bottom and top views of die 32, respectively. In FIG. 14, hexagonal base 34 has milled vertices 36 used to form the optional triangle struts. The top view of FIG. 15 depicts the meeting of three parallelogram walls 42 at apex 40.

Figure 16:
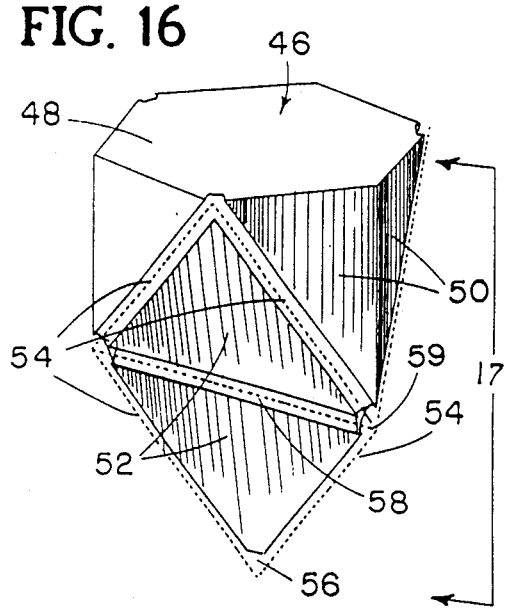
FIG. 16 is a diagrammatic view of a die according to a third embodiment of the present invention, the die having milled parallelogram edges and horizontal grooves for making the parallelogram and horizontal support struts.

The second strut embodiment depicted in FIGS. 11 through 15 may be modified to include additional horizontal struts for added strength. The die used to create the third embodiment having parallelogram and horizontal struts is depicted in FIGS. 16 through 20. In FIG. 16, die 46 has parallelogram struts 54 and horizontal struts 58. Horizontal struts 58 are formed across the parallelogram walls 52 so that each horizontal strut 58 joins the two opposing vertices of parallelogram wall 52 which are closest together. All parallelogram side walls of the dies have horizontal struts except for those on the perimeter of the array of dies used to form each mold section. These peripheral parallelogram side walls remain flat so that the cores made by two adjacent mold sections may be glued together. The horizontal struts are formed by placing horizontal grooves in the parallelogram side walls.

The use of horizontal and parallelogram struts creates a twelve-point hub 59 when two adjacent dies with milled edges and horizontal grooves are adjacent to each other. Plastic flowing from this twelve-point hub radiates in twelve directions so that twelve parallelogram and horizontal struts are made that meet at the hub. The use of twelve point hubs achieves optimal strength and distributes any stress placed on the structure for increased durability and compressibility.

Figure 17:
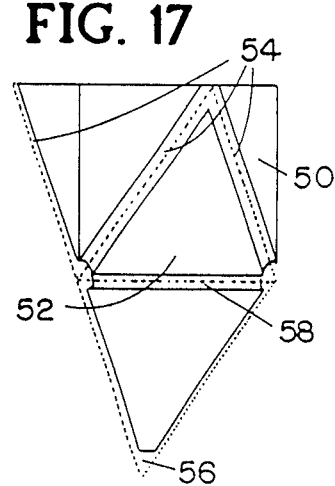
FIG. 17 is a side view of the die of FIG. 16 taken along line 17—17.
Figure 18:
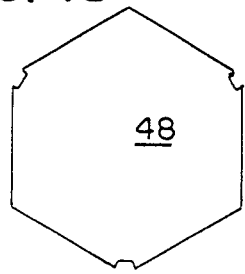
FIG. 18 is a bottom view of the base of the die depicted in FIG. 16 showing the hexagonal base.

FIG. 17 is a side view of the diagrammatic view of the die in FIG. 16. In FIG. 17 parallelogram struts 54 define the boundaries between triangular walls 50, as well as the boundaries between triangular walls 50 and parallelogram walls 52. Apex 56 of the die is milled down to aid in the forming of the support struts FIG. 18 is a bottom view of die 46 showing the hexagonal base 48.

Figure 19:
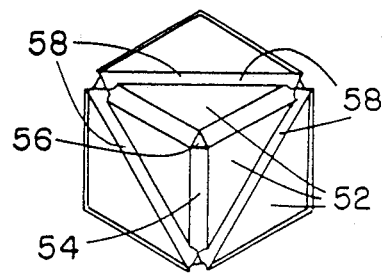
FIG. 19 is a top view of the die depicted in FIG. 16 with the milled apex at the center.
Figure 20:
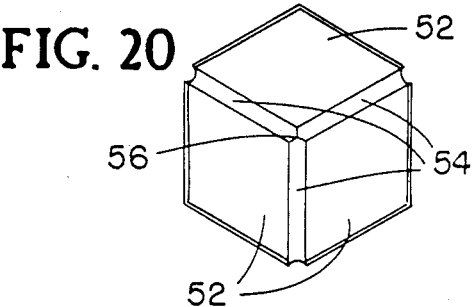
FIG. 20 is a top view of the die depicted in FIG. 16 excluding the horizontal support struts.

FIGS. 19 and 20 are top views of the die with the milled apex 56 at the center of the drawings. FIG. 19 differs from FIG. 20 in that FIG. 19 depicts horizontal struts 58 whereas FIG. 20 omits them. It is apparent from FIG. 19 that horizontal struts 58 will significantly increase the compressible strength of the structure when a force is placed upon apex 56 or base 48.

Figure 21:
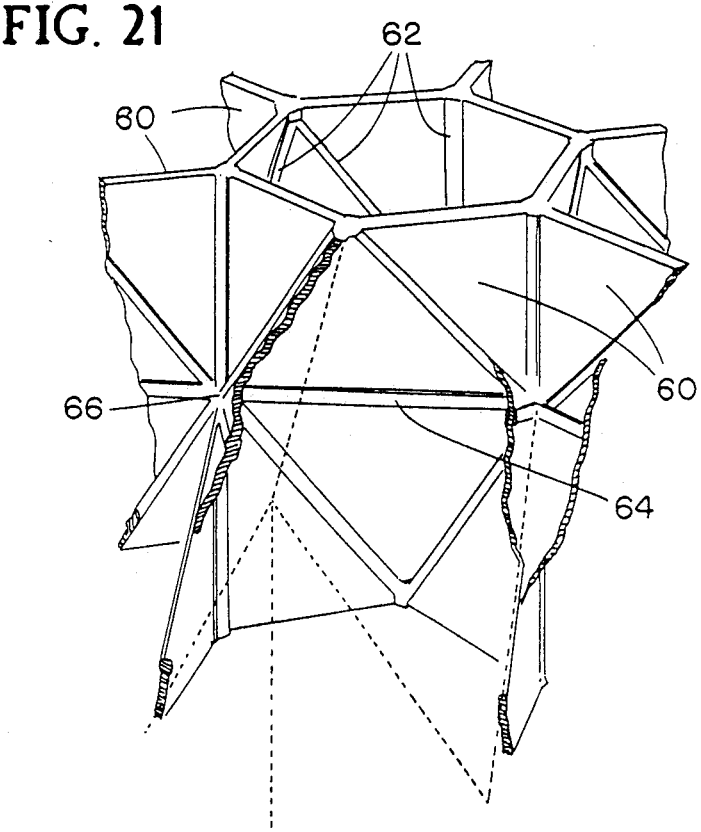
FIG. 21 is a fragmentary perspective view of a fourth embodiment of the truss structure having solid planar side walls as well as parallelogram and horizontal support struts.

FIG. 21 is a fragmentary perspective view of a fourth embodiment of the truss structure having solid planar side walls 60 as well as parallelogram support struts 62 and horizontal struts 64. The structure depicted in FIG. 21 has maximum strength due to the combination of both solid side walls, parallelogram struts, and horizontal struts. It is also heavier than the other embodiments of the invention.

Figure 22:
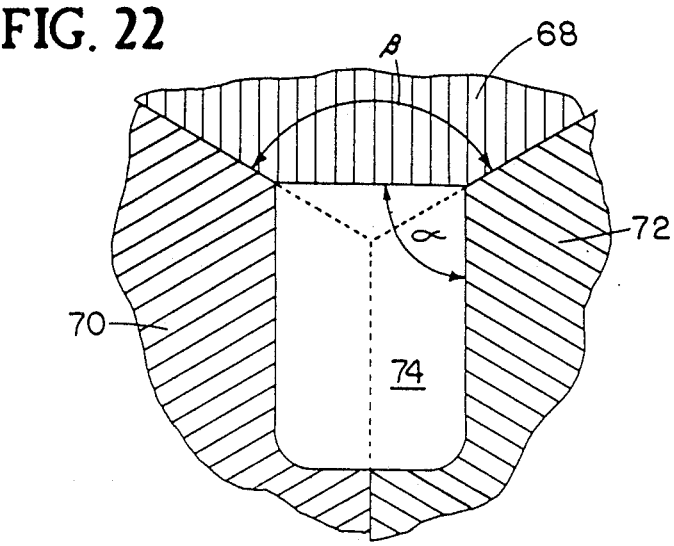
FIG. 22 is a drawing depicting the meeting of three milled edges used to form a parallelogram strut.

Each parallelogram strut is formed by the meeting of three parallelogram edges from three different dies. One of these dies is from one die array, and two of the dies are from the other die array. The cross-sectional shape of the parallelogram strut must be chosen so that the molds containing the die arrays are able to separate after the strut has been formed from molten plastic. FIG. 22 depicts three dies 68, 70 and 72 having milled parallelogram edges which form a parallelogram strut 74 when the three milled edges meet. In FIG. 22, die 68 is from one die array, and dies 70 and 72 are from the other die array. To permit the molds to separate, the angle b must be chosen so that it is less than 120° and the angle a should typically be less than or equal to 90°. The angle b should be 120° if the die bases are regular hexagons. If angle a is greater than 90°, the molds may separate but the core will stick in one mold.

FIG. 23 depicts a preferred cross-sectional shape of a parallelogram strut. In FIG. 23, parallelogram strut 76 has two rounded corners, and two corners which form 90° angles. If strut 76 had a round shape, the condition that a is less than 90° would not be met, and the molds would not easily separate.

FIG. 24 depicts a top view of a parallelogram strut meeting another parallelogram strut at a parallelogram vertex. An upper parallelogram strut 78 is formed by the meeting of two upper dies and one lower die. A lower parallelogram strut 80 is formed by the meeting of two lower dies and one upper die. Struts 78 and 80 are connected such that they are identical in cross-sectional shape except that strut 78 is rotated 180° with respect to strut 80.

FIGS. 25A through 25D depict some alternate cross-sectional shapes for the parallelogram struts. The strut shape depicted in FIG. 25C, for example, is more difficult to make than the shape depicted in FIG. 23 because only two rounded corners are required to be milled in the design in FIG. 23. The struts' length, diameter, shape, and resin material may be varied depending upon the strength requirements of the particular application.

Like the design of the parallelogram struts, the cross-sectional shape of the horizontal struts must be chosen so that the upper and lower molds may easily separate. In FIG. 26, two dies 90 and 92 have horizontal grooves that meet to form a horizontal strut.

FIG. 27 depicts a preferred cross-sectional shape of a horizontal strut 94. Horizontal strut 94 is formed by the meeting of two dies at line 96. The surfaces of both dies are grooved to form strut 94.

A primary advantage of the truss structure core according to the present invention is that it may be easily molded, drawn, or stamped from metal. In any of these processes, an array of adjacent tetrahexagonal dies are arranged with their bases on a flat plate to form one die array. This die array is then aligned with and moved close to an opposing but similar die array to create the truss structure. The core material is placed between the opposing die arrays to create the core.

Figure 29:
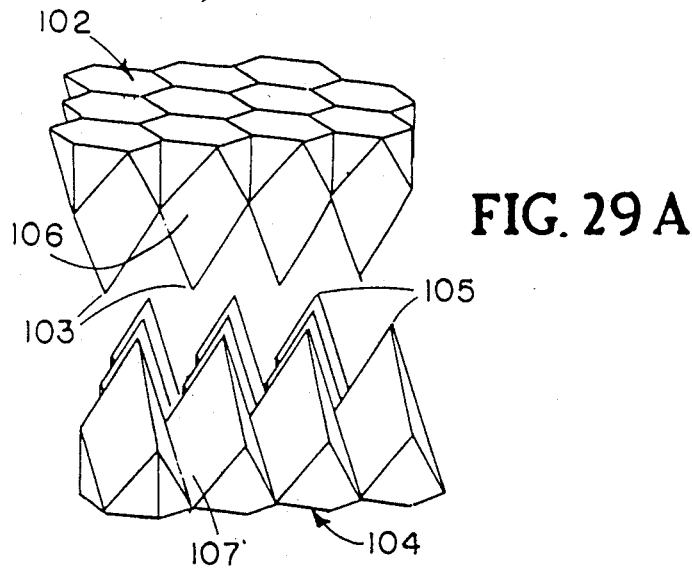
FIGS. 29A through 29D depict the sequence in which the upper and lower die arrays come together to make a core structure according to any of the above embodiments.
Figure 29:
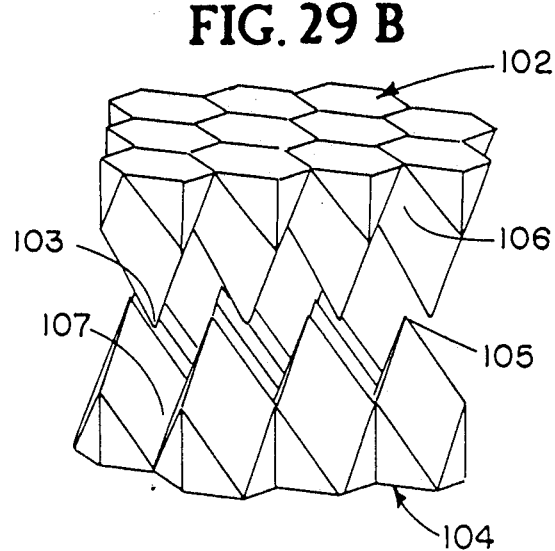
Figure 29:
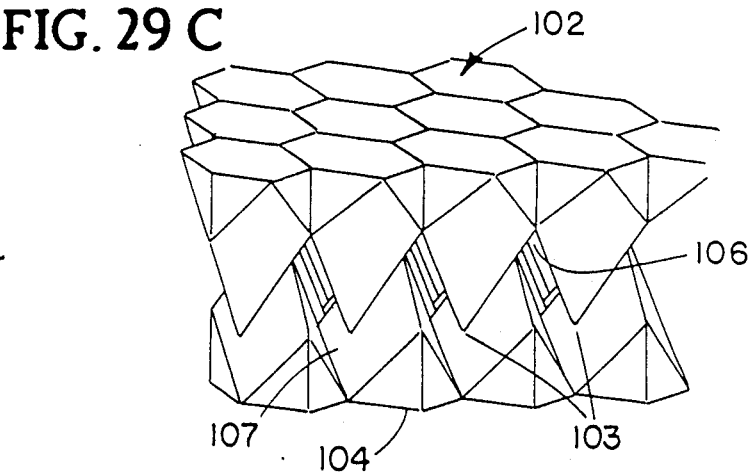
Figure 29:
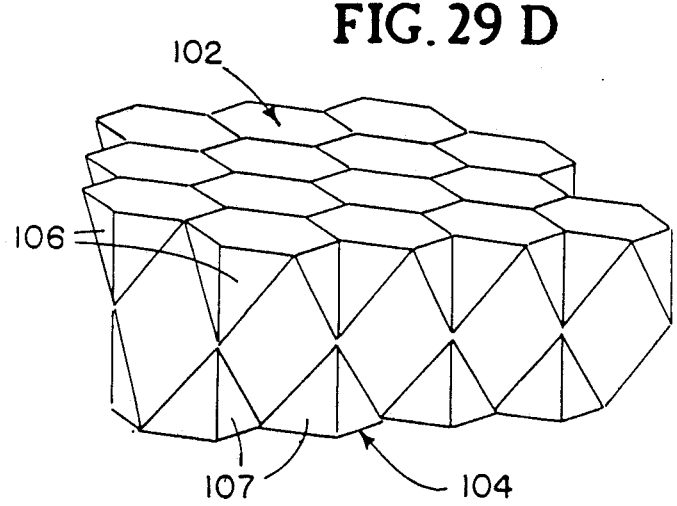

FIGS. 29A through 29D depict the sequence in which an upper die array 102 is positioned close to a lower die array 104 to create the truss structure core. In FIGS. 29A through 29C, the apices 103 of upper dies 106 are positioned close to, and aligned to fit in, the cavities between lower dies 107. Similarly, apices 105 of lower dies 107 are positioned close to and aligned to fit in the cavities between upper dies 106. If molten plastic is used as the core material, it is injected into the remaining spaces between dies 106 and 107 to form the core of the truss structure.

The die arrays depicted in FIGS. 29A through 29D may be made from individual dies that are cut from hexagonal bar stock and affixed to a plate in an array. The die arrays may also be cast from single blocks of metal by electronic discharge machining. The individual dies have the same shape regardless of whether the mold is created by electronic discharge machining or if they are individually made. The truss structure core may be made with an open mold, stamped, or drawn from metal because the entire surface area of each cavity in the core is the same as its outer surface area; there is no additional surface area in the interior of the cavities of the truss structure. The structure may be made out of any moldable or extrudable plastic. To make a curved structure, a flat core is made and then simply bent into the desired shape before the upper and lower skins are applied.

Figure 30:
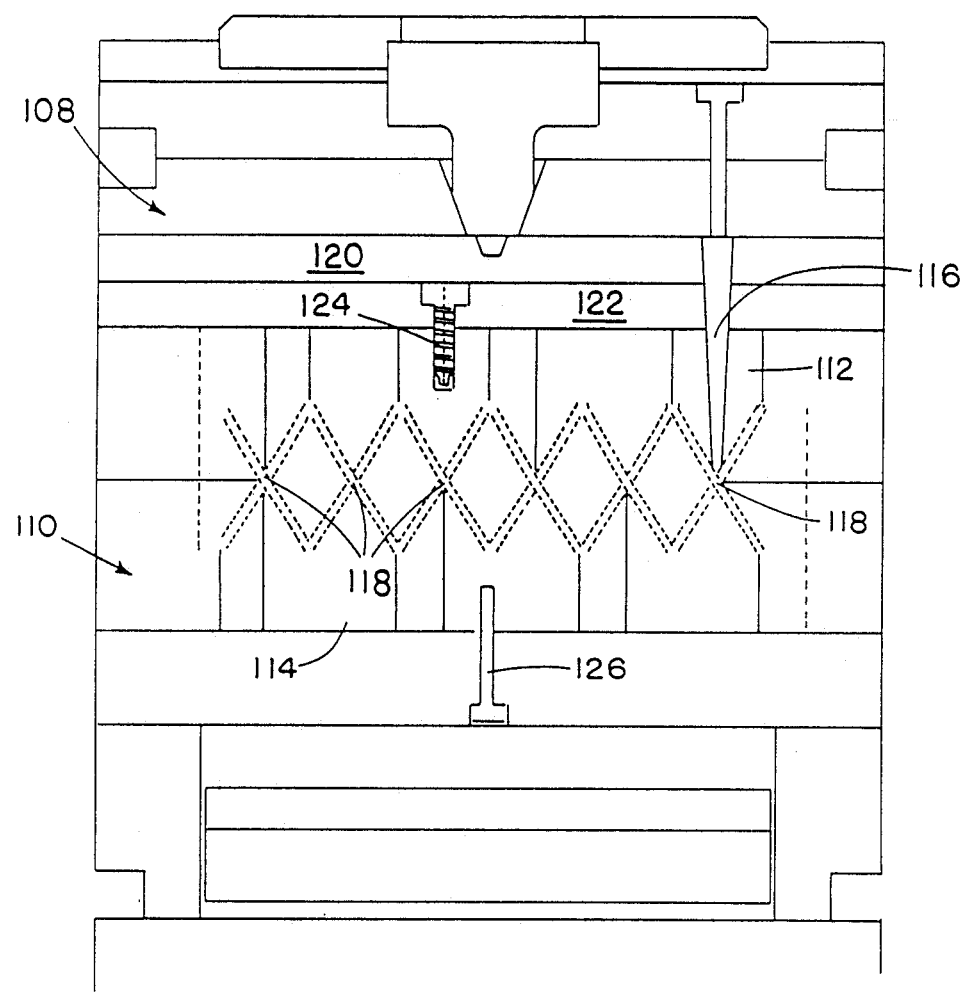
FIG. 30 is a side view of the jig used in making the core of the truss structure.

FIG. 30 depicts a jig assembly used to mold the truss structure having hollow walls. The jig assembly is comprised of an upper mold assembly 108 having an upper mold 112 comprised of an array of adjacent dies whose hexagonal bases are attached to an upper plate. The jig assembly also has a lower mold assembly 110 including a lower mold 114 having an array of adjacent opposing dies whose hexagonal bases are attached to a lower plate. The dies attached to both the upper and lower plates have milled parallelogram edges to permit plastic to flow between the parallelogram edges to create the parallelogram struts. The dies may also have milled first triangle edges and horizontal grooves to form the first triangle struts and horizontal struts, respectively.

Upper mold assembly 108 also includes a runner plate 120 that is used to distribute the plastic into the correct locations. Runner plate 120 has a vertical injection hole 116 in it for each twelve-point hub to be created in the truss structure. Molten plastic flows through injection holes 116 to twelve-point hubs 118, whereupon it is distributed in twelve directions to create the structure having parallelogram and horizontal struts.

To make the embodiments of the core having solid planar walls, dies without milled edges are used. Molten plastic flows across the lower mold 114, and is formed into the correct shape by positioning upper mold assembly 108 and upper mold 112. To stamp or draw the structure from metal, a sheet of metal is placed on lower mold 114 and formed into the correct shape by a compressive downward force applied to upper mold assembly 108.

After the core has been molded, stripper plate 122 pulls off the vertical columns of plastic from the upper mold resulting from the injection of plastic through injection holes 116. A spring assembly 124 causes the upper mold 112 and lower mold 114 to separate in the proper sequence. Ejection pin 126 then ejects the core out of the jig after the mold has separated by striking the core apices on the lower honeycomb array surface.

Figure 31:
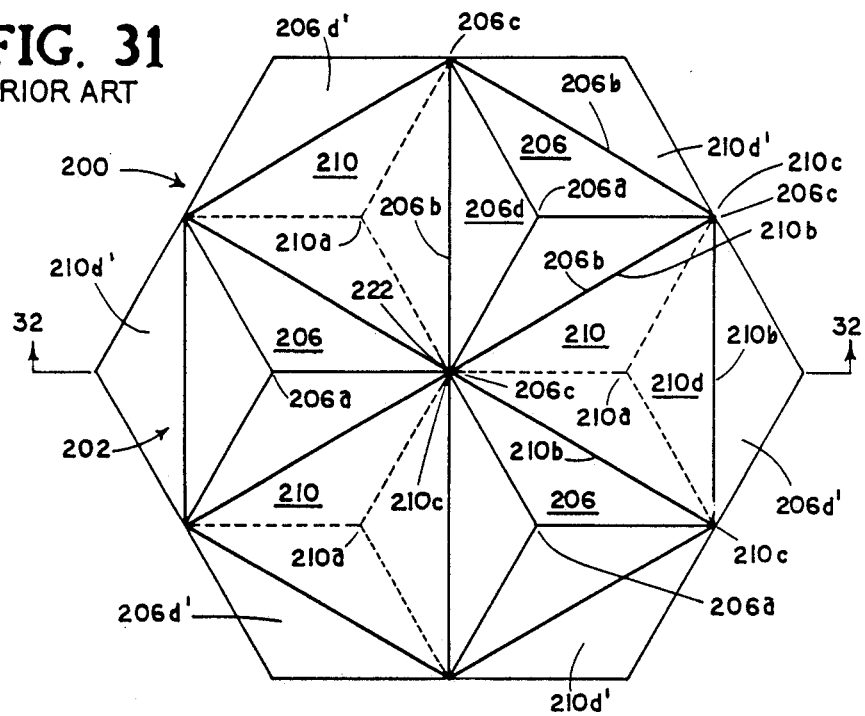
FIG. 31 is a plan view illustrating a prior art structure which forms a basis for alternative embodiments of the present invention.
Figure 32:
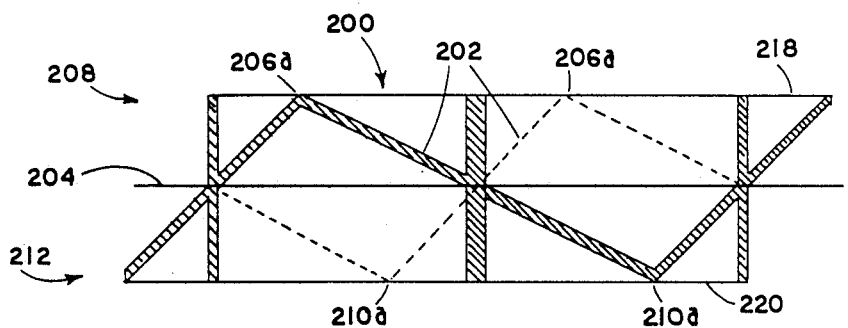
FIG. 32 is a cross-sectional view taken on a line 32—32 of FIG. 31.
Figure 33:
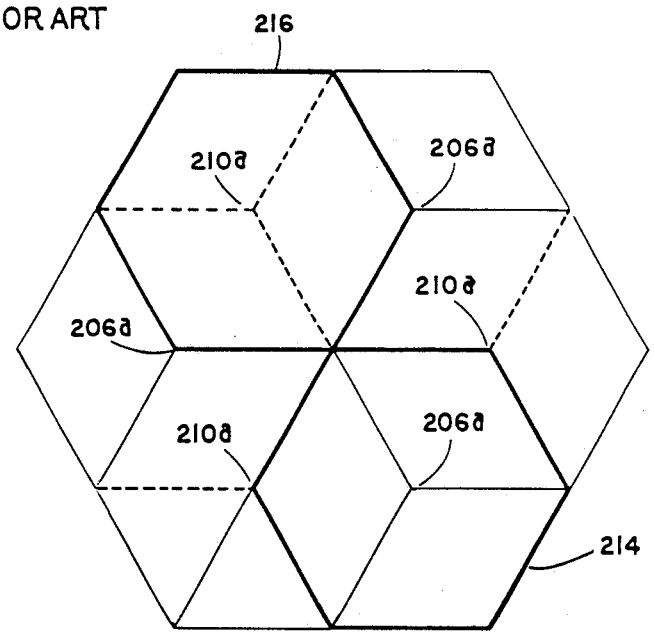
FIG. 33 is an idealized plan view of the structure of FIGS. 31 and 32 illustrating tetrahexagonal cavities defined thereby.

Referring now to FIGS. 31 to 33, the prior art configuration of the Borgford and Scurlock patents which constitutes the basis for alternative embodiments of the present invention is illustrated in simplified form. A basic structure 200 includes a continuous surface 202 which is formed about a central plane 204. The surface 202 includes three hollow tetrahedrons 206 having apices 206a which are disposed on a first side 208 (extending out of the plane of the drawing as viewed in FIG. 31) of the central plane 204, and base edges 206b which lie in the central plane 204. The base edges 206b intersect at base vertices 206c. The apices 206a and base edges 206b define sides 206d.

The surface 202 also includes three hollow tetrahedrons 210 having apices 210a which are disposed on a second side 212 (extending into the plane of the drawing as viewed in FIG. 31) of the central plane 204, and base edges 210b which lie in the central plane 204. The base edges 210b intersect at base vertices 210c. The apices 210a and base edges 210b define sides 210d.

The tetrahedrons are interconnected such that the base edges 206b and 210b, and base vertices 206c and 210c, of adjacent tetrahedrons 206 and 210 respectively, coincide with each other. The apices 206a and 210a of alternating tetrahedrons 206 and 210 are disposed on the first and second opposite sides 208 and 212 of the central plane 204 respectively. The apices 206a define a first plane 218 on the first side 208, whereas the apices 210b of the tetrahedrons 210 define a second plane 220 on the second side 212.

Each pair of sides 206d and 210d which share a common base edge 206b, 210b, constitute a planar parallelogram side or wall corresponding to the wall 42 of the die 33 illustrated in FIGS. 11 to 15. Each point where six base vertices 206c, 210c meet defines a hub 222 which corresponds to the hub 66 shown in FIG. 21. A main difference between the structure 200 and the solid-wall embodiment described above is that the structure 200 does not contemplate the the planar side walls designated as 60 in FIG. 21. It will be noted that the side walls 60 extend perpendicular to the central plane of the structure.

Each tetrahedron 206, in combination with the three adjacent sides 210d of the three adjacent tetrahedrons 210 having base edges 210 b common with the base edges 206b of said tetrahedron 206, defines a tetrahexagonal cavity corresponding to the cavities 12 shown in FIGS. 1 and 2. The structure 200 includes six of these cavities, with three opening on the first side 208 and three opening on the second side 212 of the structure 200. As viewed in FIG. 33, the cavities having apices 206a on the first side 208 and opening toward the second side 212 are designated as 214. The cavities having apices 210a on the second side 212 and opening toward the first side 208 are designated as 216. Further illustrated in FIG. 31 are extended sides 206d' and 210d' of tetrahedrons which are not completely shown in FIGS. 31 to 33, and which are added to the structure 200 in order to define six complete cavities. It will be understood, however, that a tetrahexagonal structure of the invention may include any number of cavities or parts thereof.

The solid core and strut structures described with reference to FIGS. 1 to 30, without the addition of external skins 14 and 16, are relatively flexible, with the strut structure being much more flexible than the solid structure. These structures may be made resistant to bending by adding the skins, which interconnect the vertices of the tetrahedrons. The embodiments of the invention based on the structure 200 replace the skins with perpendicular support walls which greatly increase the stiffness and bending resistance of the structure, while attaining a major reduction in weight and volume.

The prior art structure 200 as illustrated in FIGS. 31 to 33 is quite flexible, since the apices 206a and 210a are not interconnected by any means except for the sides 206d and 210d of the tetrahedrons 206 and 210. The present invention adds to the structure 200 perpendicular walls which function as I-beams and greatly increase the stiffness of the structure with relatively small additional weight compared to the skins.

Figure 34:
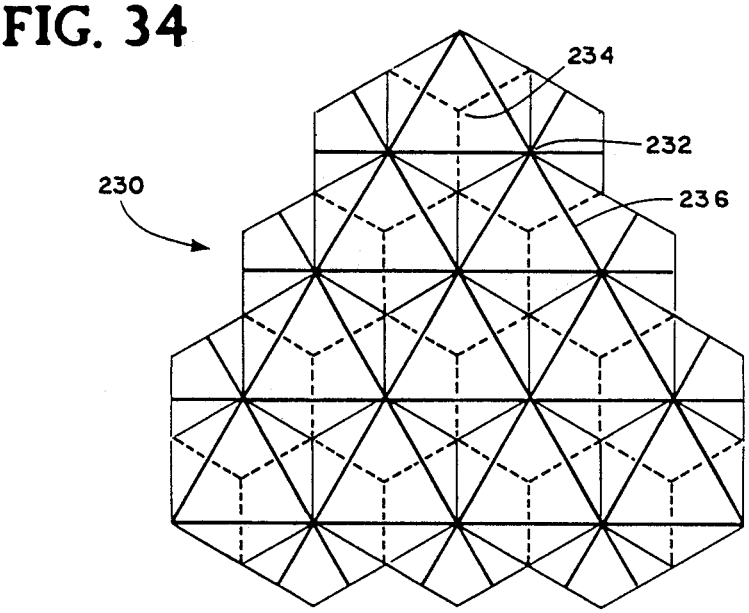
FIG. 34 is a plan view illustrating an embodiment of the present invention based on the prior art structure of FIGS. 31 to 33.

A first embodiment of the invention including perpendicular support walls is illustrated in FIG. 34. A structure 230 includes any desired number of alternating tetrahedrons defining tetrahexagonal cavities having apices 232 and 234 disposed on opposite sides of the structure 230 in the manner illustrated and described with reference to FIGS. 31 to 33. The tetrahedrons define a continuous surface, which may have solid sides, hollow sides defined by struts, or a combination of solid sides and struts, as described above. The structure 230 further includes perpendicular support walls 236 which interconnect the vertices 232. More specifically, the walls 236 extend perpendicular to the central plane of the structure 230.

The walls 236 may completely interconnect adjacent apices 232 as illustrated, or extend only partially therebetween. The walls 236 preferably originate at the plane defined by the apices 232, and extend toward the plane defined by the apices 234. The walls 236 may terminate at the underlying tetrahedral sides which define the continuous surface. It is further within the scope of the invention to have the walls 236 extend between the plane defined by the apices 234 and the tetrahedral sides, or completely between the planes of the apices 232 and 234. It is also possible to have the walls 236 extend only partially away from the tetrahedral sides to positions spaced inwardly from either of the planes of the apices 232 and 234. Yet another alternative is to have the walls 236 extend completely between the apices 232 on one side of the structure 230 and only partially between the same apices 232 on the other side of the structure.

Figure 35:
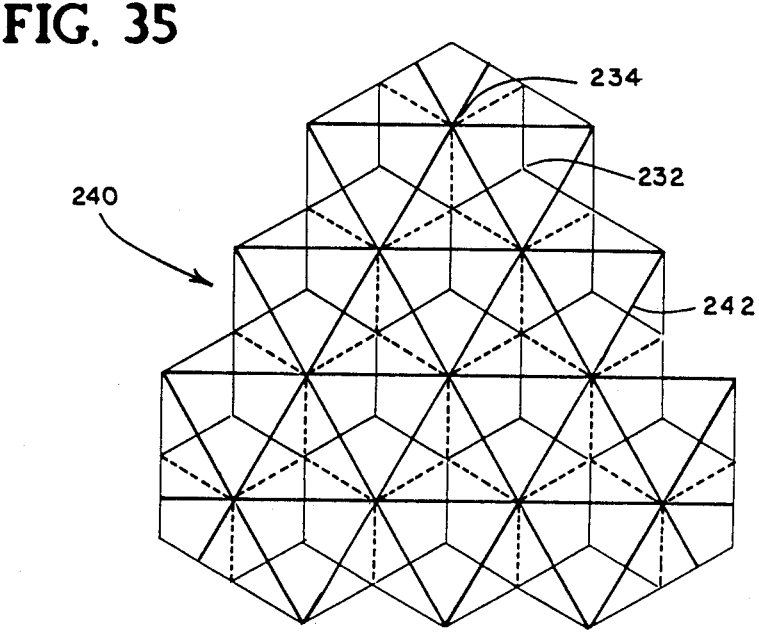
FIG. 35 is similar to FIG. 34 but illustrates a variation thereof.

FIG. 35 illustrates another structure 240 of the invention which includes perpendicular walls 242 interconnecting the apices 234 on the opposite side of the structure 240 from the apices 232. All of the combinations described with reference to the structure 230 apply equivalently to the structure 240.

Figure 36:
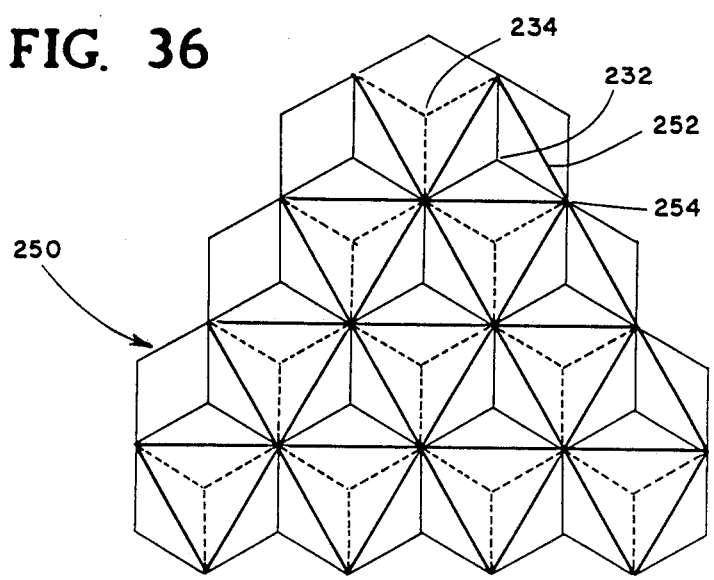
FIG. 36 is also similar to FIG. 34 but illustrates another variation thereof.

FIG. 36 illustrates another structure 250 which includes perpendicular walls 252 interconnecting hubs 254 which correspond to the hubs 222 shown in FIGS. 31 to 33. The walls 252 may be provided on either or both sides of the structure 250, and extend completely or partially between adjacent hubs 254, in any of the combinations described above with reference to the structure 230.

Figure 37:
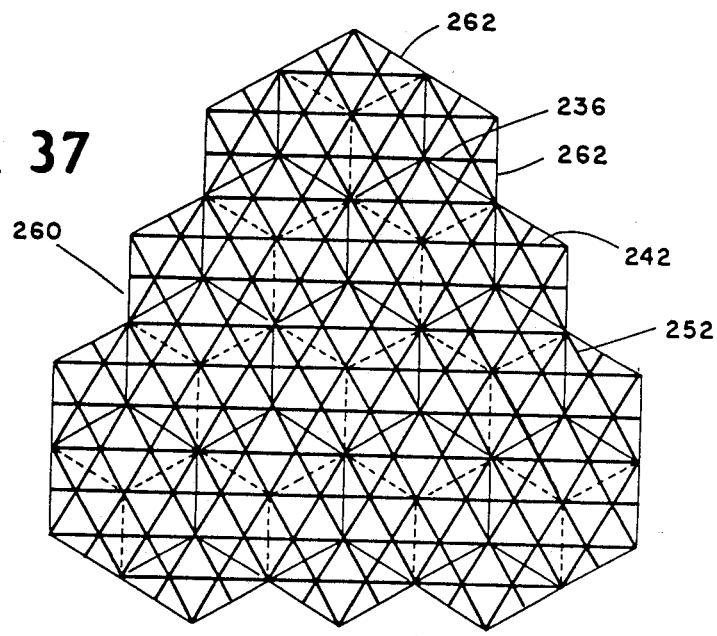
FIG. 37 is a plan view illustrating a combination of all of the embodiments of FIGS. 34 to 36.

FIG. 37 illustrates a structure 260 including all of the walls 236, 242 and 252 illustrated and described with reference to FIGS. 34 to 36 respectively. The walls 236, 242 and 252 may be provided on either or both sides of the structure 260, and extend completely or partially between adjacent apices or hubs, in any combination with each other, in any of the alternative forms described above. In addition, the peripheral edges of the structure 260 may be made to terminate in perpendicular walls 262, which correspond to the planar side walls 60 shown in FIG. 21.

The walls 236 and 242 are defined by planes which extend perpendicular to the central plane of the structure, and pass through lines interconnecting the apices 232 and 234 respectively. The walls 252 are defined by planes passing through lines interconnecting the hubs 254. It will be noted that the planes which define the walls 252 pass through the base edges 206b, 210b, which in turn define the central plane 204.

FIGS. 38 to 41 illustrate a preferred example of a combination of perpendicular support walls provided in accordance with the present invention. A structure 270 includes the perpendicular support walls 236 interconnecting adjacent apices 232 as in the structure 230 of FIG. 34. The walls 236 extend from the plane of the apices 232 to the surface defined by the underlying tetrahedral sides. The three walls 236 surrounding each hub 254 define a closed triangle 272.

The structure 270 further includes perpendicular support walls 242' which are defined by lines interconnecting the apices 234 as in the embodiment of FIG. 35. However, the walls 242' are provided on the same side of the structure 270 as the walls 236 (extending from the plane of the apices 232 to the underlying tetrahedral sides). Further, the walls 242' only extend between intersecting walls 236 within the triangles 272.

Figure 38:
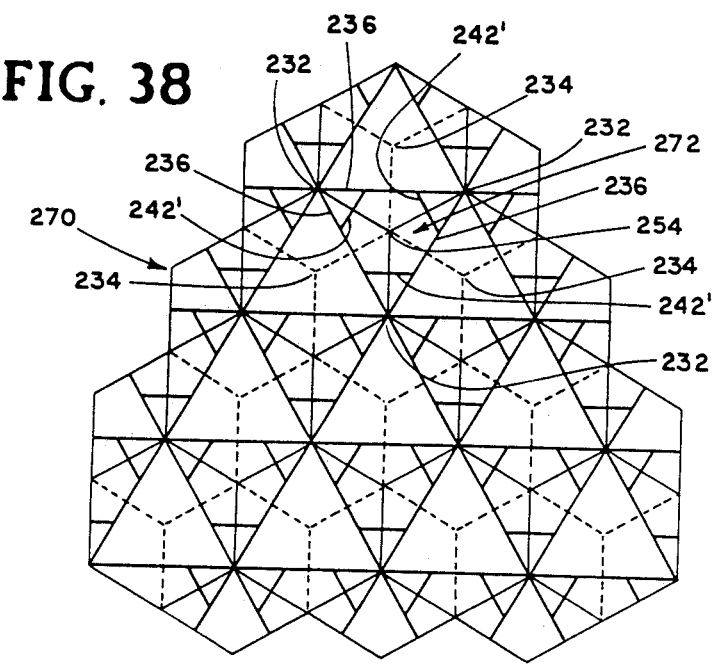
FIG. 38 is a plan view illustrating partial combination of the embodiments of FIGS. 35 and 36.
Figure 39:
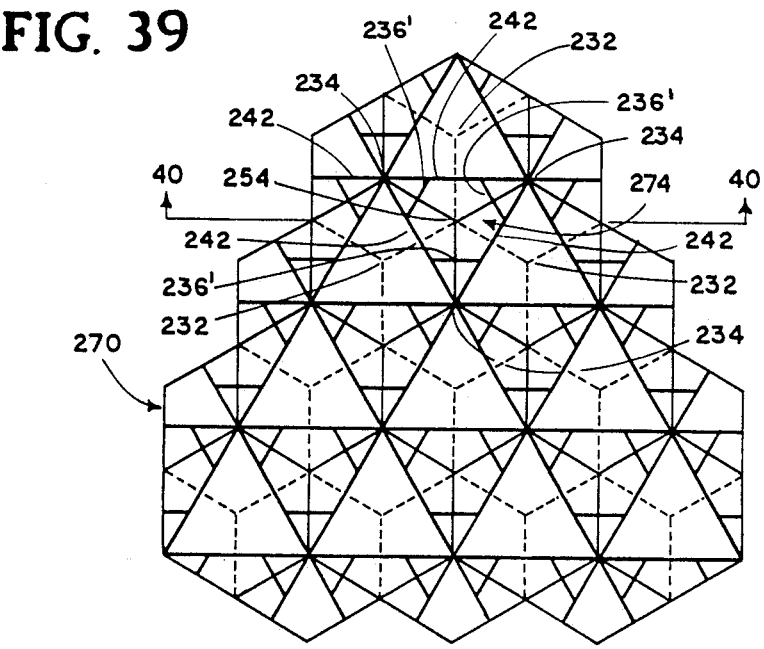
FIG. 39 is a plan view illustrating the embodiment of FIG. 38 from an opposite side thereof.
Figure 40:
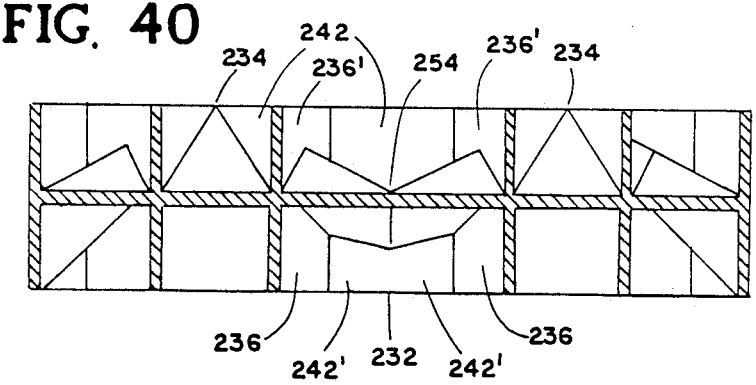
FIG. 40 is a section taken on a line 40—40 of FIG. 39.
Figure 41:
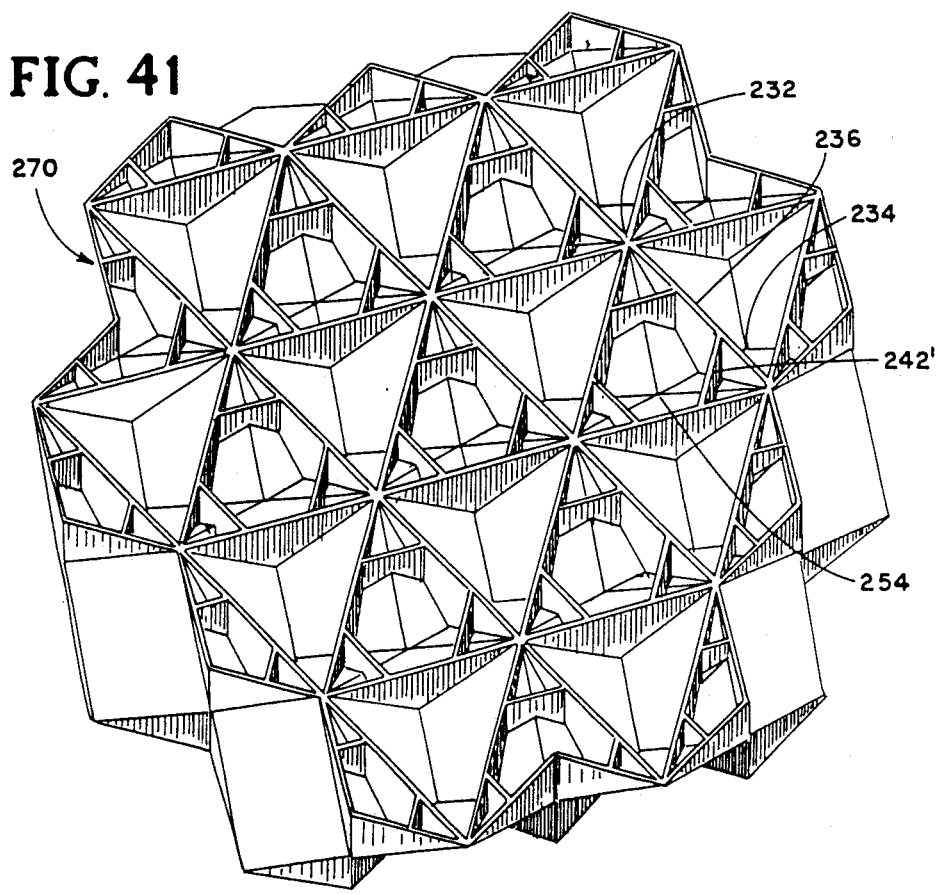
FIG. 41 is a perspective view of the embodiment of FIGS. 38 to 40.

As viewed in FIG. 39, the opposite side of the structure 270 is essentially a mirror image of the side shown in FIG. 38, and includes the perpendicular support walls 242 interconnecting adjacent apices 234 as in the structure 240 of FIG. 35. The walls 242 extend from the plane of the apices 234 to the underlying tetrahedral sides. The three walls 242 surrounding each hub 254 define a closed triangle 274.

The opposite side of the structure 270 further includes perpendicular support walls 236' which are defined by lines interconnecting the apices 232 as in the embodiment of FIG. 34. However, the walls 236' are provided on the same side of the structure 270 as the walls 242 (extending from the plane of the apices 234 to the underlying tetrahedral sides). Further, the walls 236' only extend between intersecting walls 242 within the triangles 274.

Due to the greatly increased rigidity provided by the perpendicular support walls, a structure of the invention as illustrated in FIGS. 34 to 41 may be made considerably thinner than the structures illustrated in FIGS. 1 to 33, and still have high compressive strength and resistance to bending without the addition of external skins. It is therefore possible to make the apex angle $\tau$ very large, on the order of 110° to 115°, with the maximum possible value approaching 120° as described above.

Figure 42:
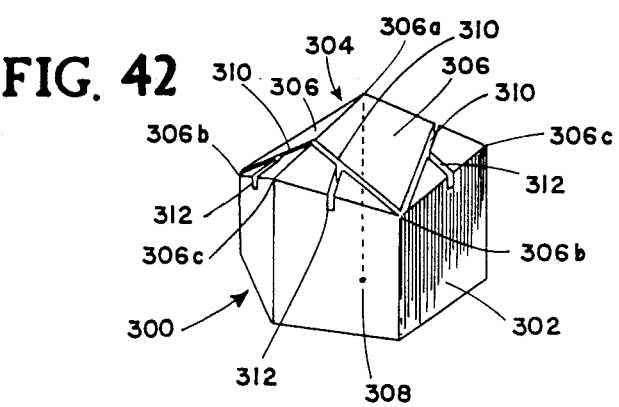
FIG. 42 is a perspective view of a die used to make the structure of FIGS. 38 to 41.

A mold die 300 for fabricating the structure 270 is illustrated in FIG. 42. It will be understood that the die 300 is an individual element of an array of dies to be used in the manner described above with reference to FIGS. 29A to 30. The die 300 is similar to the die 22 illustrated in FIGS. 6 to 10, except that a hexagonal prism base 302 may extend beyond a tetrahexagonal end portion 304 which is actually used to form a portion of the structure 270. The tetrahexagonal end portion 304 defines an individual cavity of the structure 270 as described above.

The tetrahexagonal portion 304 has three congruent, planar sides or parallelogram walls 306. Each parallelogram wall 306 has a vertex 306a which coincides with the apex of the tetrahexagonal portion 304 and lies on a central axis 308 of the die 300, an opposite vertex 306b which lies on an edge of the hexagonal base 302, and two additional vertices 306c which lie on edges of the base 302 between each two vertices 306b. The tetrahexagonal portion 304 is formed by cutting away the end of the base 302 through three planes which pass through the apex at 306a, define the parallelogram walls 306, and make equal angles with the axis 308 and with each other.

Assuming that the die 300 is part of an array of identical dies being used to form the side of the structure 270 illustrated in FIG. 38, the die 300 is formed with three slots 310 which extend completely between adjacent vertices 306b and form the perpendicular support walls 236 of the structure 270. The slots 310 extend parallel to the axis 308 of the die 300, or equivalently perpendicular to the central plane of the structure 270.

The die 300 is further formed with six slots 312 which extend parallel to the axis 308 and define the perpendicular support walls 242' of the structure 270. The slots 312 are defined by lines connecting the apex 306a of the tetrahexagonal portion 304 with the apices 306a of six surrounding dies 300 (not shown), and extend only from the slots 310 to the periphery of the base 302. It will be noted that slots 310 perpendicularly intersect the midpoints of the hexagonal sides of the die 300.

Although the die 300 which constitutes a preferred embodiment of the present invention is illustrated as being formed only with slots corresponding to the walls 236 and 242', the invention is not so limited. The die 300 may additionally have slots for forming complete or partial walls 236, 242 and 252 in any of the combinations described above.

Figure 43:
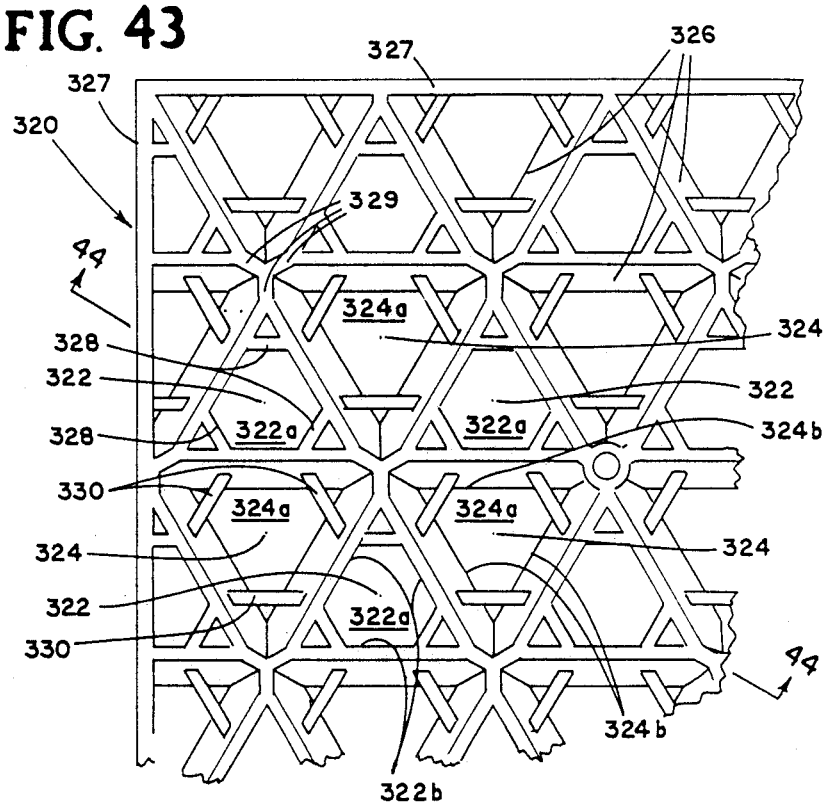
FIG. 43 is a plan view of another embodiment of the present invention, corresponding to the embodiment of FIGS. 38 to 41 with apices of the structure truncated and hollowed.
Figure 44:
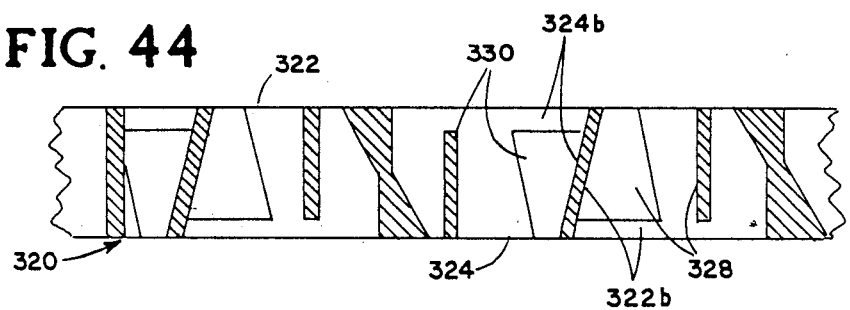
FIG. 44 is a section taken on a line 44—44 of FIG. 43.

FIGS. 43 and 44 illustrate a modified structure 320 based on the embodiment of FIGS. 38 to 41, in which the apices of the tetrahedrons are truncated and made hollow. It is generally within the scope of the invention to provide truncated and/or hollow apices in any embodiment thereof.

The structure 320 is formed of an alternating pattern of tetrahedrons having apices at points 322 and 324 disposed on opposite side respectively of a central plane of the structure 320 as described above. The tetrahedrons are truncated and cut away to form hollow apices 322a and 324a defined by edges 322b and 324b of a surface 326 of the structure 320.

In accordance with the present invention, perpendicular support walls 328 extend between triangular portions of the surface 326 which define the edges 322b. The walls 328 lie on lines interconnecting the apex points 324. In addition, perpendicular support walls 330 are provided which extend between triangular portions of the surface 326 which define the edges 324b. The walls 330 lie on lines interconnecting the apex points 322. The walls 328 and 330 may extend completely or partially through the thickness of the structure 320 as desired.

The structure 320 may be formed as a panel for assembly with similar panels to provide a much larger unit or wall. FIG. 43 illustrates perpendicular side walls 327 which provide a border around the structure 320, and facilitate attachment by adhesive or the like to adjacent structures. Further illustrated are perpendicular walls 329, which correspond to the planar side walls 60 shown in FIG. 21, and may be incorporated into the structure 320 by providing spacing between the dies used to mold the structure in the manner described above.

Figure 45:
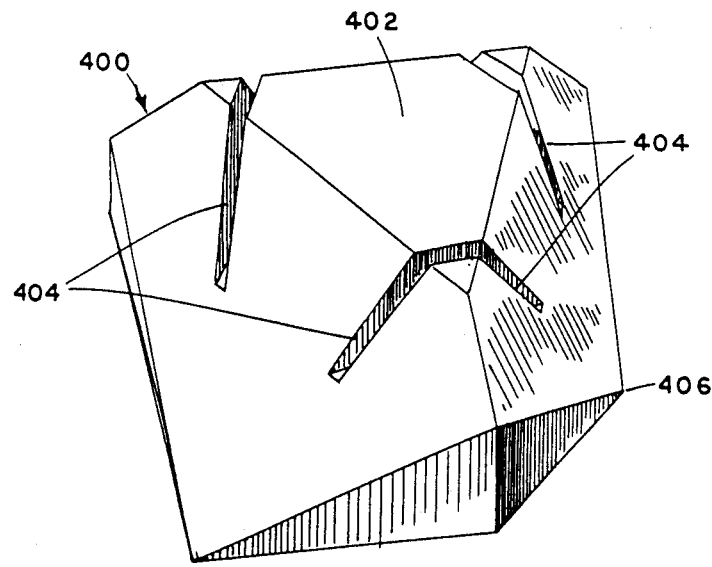
FIG. 45 is a perspective view illustrating a die for forming the structure of FIGS. 43 and 44.

A die 400 for fabricating the structure 320 is illustrated in FIG. 45. The die 400 has a basic shape which is similar to that of the die 300 shown in FIG. 42 except that the end thereof is truncated to form a triangle 402. The botttom of the die 400 is also truncated by an amount equal to the height taken from the end thereof. Perpendicular slots 404 are formed in the die 400 interconnecting base vertices 406 thereof. The slots 404 and vertices 406 correspond to the slots 310 and base vertices 306b of the die 300 respectively.

Figure 46:
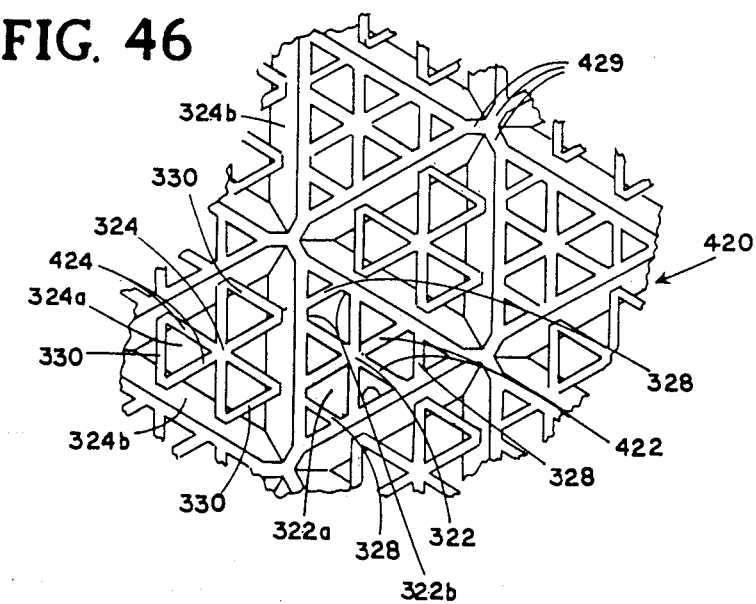
FIG. 46 is a plan view illustrating a variation of the embodiment of FIGS. 43 and 44.

A modification of the structure 320 is illustrated in FIG. 46 and designated as 420, with like elements being designated by the same reference numerals. In addition to the support walls 328 and 330, the structure 420 comprises perpendicular support walls 422 which lie on lines interconnecting the apex points 322 and perpendicular support walls 424 which lie on lines interconnecting the apex points 324. It will be noted that six walls 422 radiate from each apex point 322, and six walls 424 radiate from each apex point 324.

The walls 328, 330, 422 and 424 may extend completely through the thickness of the structure. Alternatively, they may extend only partially therethrough. In a preferred embodiment of the structure 420, the walls 328 and 422 extend from a plane defined by the edges 322b, partially through the structure 420 to a position spaced inward from a plane defined by the edges 324b. Similarly, the walls 330 and 424 extend from a plane defined by the edges 324b, partially through the structure 420 to a position spaced inward from a plane defined by the edges 322b. This configuration may be adopted for any of the embodiments of FIGS. 34 to 46, enabling each die to be made in one piece. FIG. 46 further illustrates perpendicular walls 429 corresponding to the walls 329 in FIG. 43.

While particular embodiments of the invention have been shown and described, numerous modifications and alternate embodiments will occur to those skilled in the art. Accordingly, it is intended that the invention be limited only by the following claims.

What is claimed is:

1. A structure having a central plane with first and second opposite sides and including a plurality of hollow tetrahedrons having base edges and apices, the tetrahedrons being interconnected together along the base edges thereof, the apices of alternating tetrahedrons being disposed on the first and second opposite sides of the central plane of the structure respectively, the structure being characterized by comprising:
    support wall means extending perpendicular to the central plane and structurally interconnecting the tetrahedrons.

2. A structure as in claim 1, in which the tetrahedrons comprise solid sides.

3. A structure as in claim 1, in which the tetrahedrons have base vertices, and comprise struts interconnecting the apices and base vertices thereof.

4. A structure as in claim 1, in which the tetrahedrons have base vertices, and comprise solid sides and struts interconnecting the apices and base vertices thereof, the struts being thicker than the sides.

5. A structure as in claim 1, in which the apices are truncated.

6. A structure as in claim 5, in which the truncated apices are hollow.

7. A structure as in claim 1, in which the support wall means extend from the base edges toward a plane defined by the apices on the first side.

8. A structure as in claim 7, in which the support wall means further extend from the base edges toward a plane defined by the apices on the second side.

9. A structure as in claim 1, in which the support wall means at least partially interconnect the apices on the first side, and extend substantially from a plane defined by the apices on the first side, to sides of underlying tetrahedrons.

10. A structure as in claim 9, in which the support wall means further at least partially interconnect the apices on the second side, and extend substantially from a plane defined by the apices on the second side, to sides of underlying tetrahedrons.

11. A structure as in claim 1, in which the support wall means comprises walls defined by planes passing through lines interconnecting the apices on the second side, and extending substantially from a plane defined by the apices on the first side, to sides of underlying tetrahedrons.

12. A structure as in claim 11, in which the support wall means further comprise walls defined by planes passing through lines interconnecting the apices on the first side, and extending substantially from a plane defined by the apices on the second side, to sides of underlying tetrahedrons.

13. A structure as in claim 1, in which the support wall means comprise:
    first walls interconnecting the apices on the first side, and extending substantially from a plane defined by the apices on the first side, to sides of underlying tetrahedrons, the first walls defining first triangles which surround the intersection points of base edges of the tetrahedrons; and
    second walls defined by planes passing through lines interconnecting the apices on the second side, and extending substantially from a plane defined by the apices on the first side, to sides of underlying tetrahedrons, the second walls extending between intersecting first walls inside the triangles.

14. A structure as in claim 13, in which the apices are truncated and hollow.

15. A structure as in claim 13, further comprising:
    third walls interconnecting the apices on the second side, and extending substantially from a plane defined by the apices on the second side, to sides of underlying tetrahedrons, the third walls defining second triangles which surround the intersection points of base edges of the tetrahedrons; and
    fourth walls defined by planes passing through lines interconnecting apices on the first side, the fourth walls extending substantially from a plane defined by the apices on the second side to sides of underlying tetrahedrons, the fourth walls extending between intersecting third walls inside the second triangles.

16. A structure as in claim 15, in which the apices are truncated and hollow.

17. A structure having a central plane with first and second opposite sides and including a plurality of hollow tetrahedrons having base edges, apices, and solid sides and being interconnected together along the base edges thereof, the apices of alternating tetrahedrons being disposed on the first and second opposite sides of the central plane of the structure respectively, the structure being characterized by comprising:
    support wall means extending perpendicular to the central plane, substantially between planes defined by the apices on the first and second sides, the support wall means including:
    first walls interconnecting the apices on the first side; and
    second walls interconnecting the apices on the second side.

18. A structure as in claim 17, in which the support wall means further comprises third walls passing through the base edges.

* * * * *